United States Patent [19]

Everts

[11] Patent Number: 4,779,405
[45] Date of Patent: Oct. 25, 1988

[54] LINE-FEEDING HEAD FOR A ROTARY LINE TRIMMER

[75] Inventor: Robert G. Everts, Chandler, Ariz.

[73] Assignee: Piston Powered Products, Inc., Chandler, Ariz.

[21] Appl. No.: 45,029

[22] Filed: May 1, 1987

[51] Int. Cl.⁴ .............................................. A01D 50/00
[52] U.S. Cl. ........................................ 56/12.7; 30/276
[58] Field of Search ................... 56/12.7, 17.5, 255, 56/295; 30/276, 347

[56] References Cited

U.S. PATENT DOCUMENTS

| 4,369,577 | 1/1983 | Gise et al. | 56/12.7 |
| 4,651,421 | 3/1987 | Zerrer | 56/12.7 |
| 4,656,739 | 4/1987 | Pittinger | 56/12.7 |
| 4,667,410 | 5/1987 | Weid et al. | 56/12.7 |
| 4,672,798 | 6/1987 | Ota | 56/12.7 |

Primary Examiner—John Weiss
Attorney, Agent, or Firm—Donald D. Mon

[57] ABSTRACT

A rotary line trimmer having a rotary head from which a cutting line is fed from a drive head in response to the axial shifting of a flexible drive shaft. The drive shaft rotatingly drives the head to exert a cutting action, and additionally can cause an incremental motion within the head itself whereby to feed the line from the head.

7 Claims, 2 Drawing Sheets

LINE-FEEDING HEAD FOR A ROTARY LINE TRIMMER

FIELD OF THE INVENTION

This invention relates to rotary line trimmers used to cut vegetation.

BACKGROUND OF THE INVENTION

Rotary trimmers which cut vegetation such as grass and weeds using flexible lines (flails) that project from a rapidly turning head are well known. Because the lines are routinely eroded or broken off in use, they must be replenished from time to time. It is undesirable to have to stop the trimmer to resupply the line or lines, although such a procedure is known in the prior art.

Improvements have been made which enable the line to be resupplied while the head continues to rotate. A very popular construction for this purpose is shown in Oberg U.S. Pat. Nos. 4,274,201 and 4,524,515 in which a downwardly projecting part of the head is pounded on the ground, and which by means of a serpentine arrangement feeds out a predetermined increment of line. This is the familiar "bumphead" device.

Another improvement that can enable line to be resupplied while the head continues to rotate is shown in Perdue U.S. Pat. No. 4,134,204. This device differs from Oberg in that the line can be resupplied without pounding the head on the ground. Instead, a manually operated linkage operates a release mechanism that enables line to be fed out as the consequence of lever or button movement. Many users of trimmers prefer this style of actuation.

It is an object of this invention to improve the latter style of actuation.

Every style of line trimmer has a handle-mounted rotary head. The head is manipulated by the handle, and a motive means is mounted to the handle to rotate the head. Motive means are such as electric motors or fractional horsepower gasoline engines. The type of motive means utilized is unimportant to this invention. The motive means can be mounted either adjacent to the head, which is conventional practice with electric motors, or at the other end of the handle from the head, which is conventional practice with gasoline engines. Placing the engine at the proximal end of the handle instead of at the distal end provides an improved balance for manipulation of the implement. This of course requires transmission means between the motor and the head, which is commonly provided as a flexible drive shaft, usually in the form of a wire or cable. This construction is in widespread usage.

Prior art constructions which release line as the consequence of an actuation other than impact with the ground utilize a separate system that actuates the release means, while the flexible drive shaft rotates the head. Thus, two systems are required.

It is an object of this invention to provide a simpler line feed mechanism which operates other than by impact with the ground, and which requires only one system for both head drive and line feed. The implement is thereby made simpler, lighter, and less expensive.

In addition, prior art line feeder heads are usually spring-loaded so that they return to a starting position at the end of each feed actuation. As a necessary consequence, line is then fed in two increments, which may be an excessive total feed-out. With this invention, only one increment need be fed, and a smaller feed-out per actuation can result.

BRIEF DESCRIPTION OF THE INVENTION

A line trimmer according to this invention includes a handle having motive means such as a two-cycle internal combustion engine adjacent to its proximal end, and a housing rotatably mounted at its distal end. A flexible drive shaft is rotatably fitted in the handle, and drivingly interconnects the motive means to the head.

The head encloses a spool on which one or more lines are coiled, each line being fed out through the peripheral wall of the housing to form a flail. The spool is rotatable relative to the housing, and both the housing and the spool are driven by the flexible drive shaft. The housing and the spool do not shift along their common axis of rotation.

According to a feature of this invention, the spool has an inside wall with two sets of spaced apart lugs, each at a different place along the axis of rotation. By design, these lugs may be spaced to provide uniform or non-uniform indexing. An indexing pin is carried by the flexible drive shaft near its distal end, where it drives the spool and also limits its rotation relative to the housing. The flexible drive shaft itself is axially shiftable as well as rotatable, and as a consequence the indexing pin can be shifted from one set of lugs to the other. Each time it shifts, it permits the spool to rotate relative to the housing by a predetermined incremental spacing. As an important but optional feature, it is not spring-loaded to either position, so that only an increment respective to one set of lugs is fed out for each actuation, rather than two.

According to a preferred but optional feature of the invention, drive means is interposed between the indexing pin and the housing, operatively to connect the flexible drive shaft to the housing in order to drive the housing.

The above and other features of this invention will be fully understood from the following detailed description and the accompanying drawings, in which:

DETAILED DESCRIPTION OF THE INVENTION

Figures 1, 2:
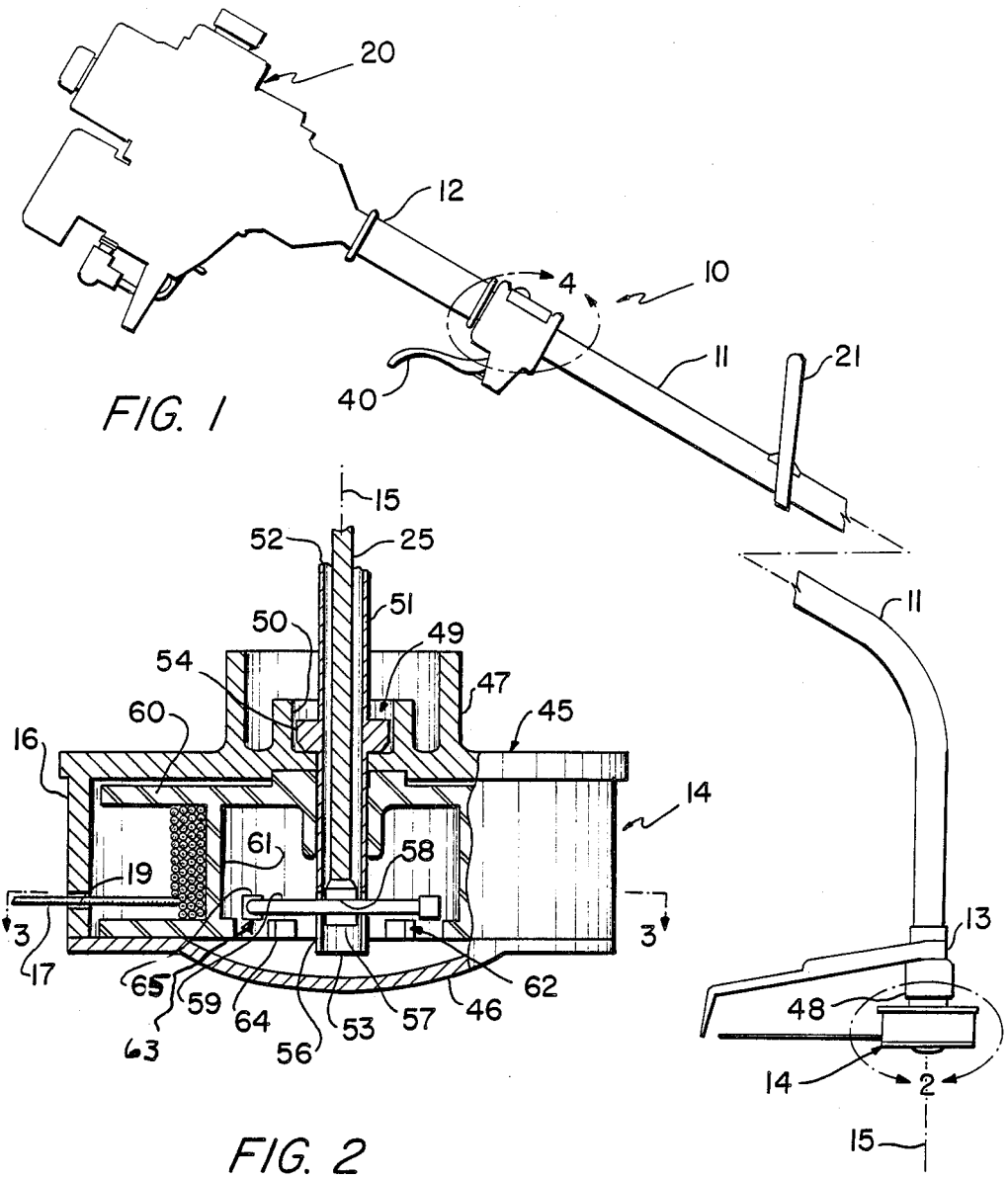
FIG. 1 is a side elevation of the presently-preferred embodiment of the invention.
FIG. 2 is a partially sectioned axial view of the head, taken at region 2 in FIG. 1.
Figure 3:
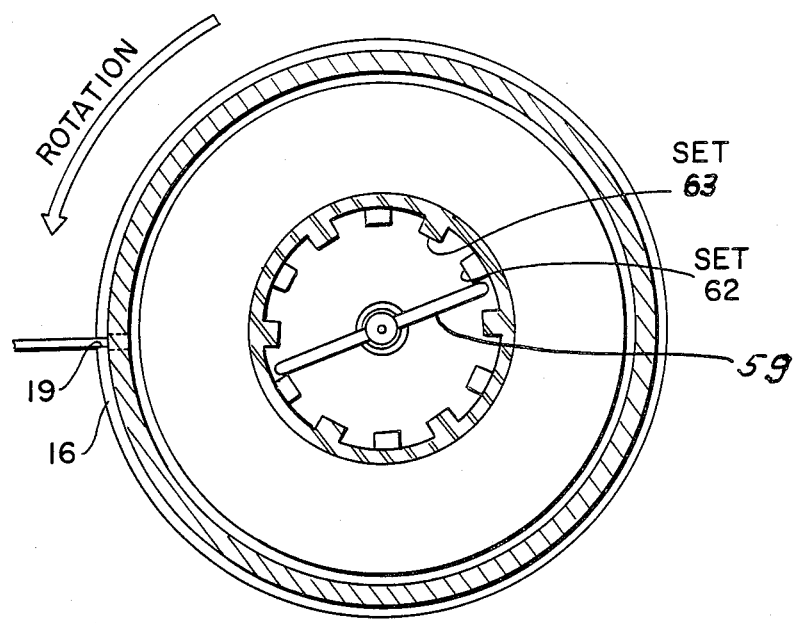
FIG. 3 is a cross-section taken at line 3—3 in FIG. 2.

A line trimmer 10 according to this invention includes an elongated tubular handle 11 having a proximal end 12 and a distal end 13. Its ultimate purpose is to rotate a rotary head 14 around an axis of rotation 15, beyond whose peripheral wall 16 project one or more flexible lines 17 which because of their velocity are inherent properties will cut vegetation in the plane of rotation. Although the drawings show only a single line passed through a single port 19, feeding line from a single coil of material, it will be recognized that a plurality of coils may instead be wound on the same spool, each passing through its own respective port, and at the same lineal speed as the others.

Motive means 20, in this example a two-cycle internal combustion engine, is mounted to the handle at the proximal end. A grip 21 is mounted to the handle between the ends to facilitate manipulation of the trimmer. Instead of an internal combustion engine, an electric motor could be supplied. In whatever arrangement, the motive means exerts torque on a flexible drive shaft 25 (FIG. 2). This shaft may be a wire or a cable, with properties that enable it to transmit torque from the motor to the head. It is conveniently fitted in a nylon sleeve 26 (FIG. 4) that facilitates its rotation. This assembly is supported at intervals along the handle by rubber inserts such as shown at 27, 28. These prevent the shaft from whipping around. Properly supported, it flexes and bends to suit the shape of the handle and to transmit torque from the motive means to the head.

Figure 4:
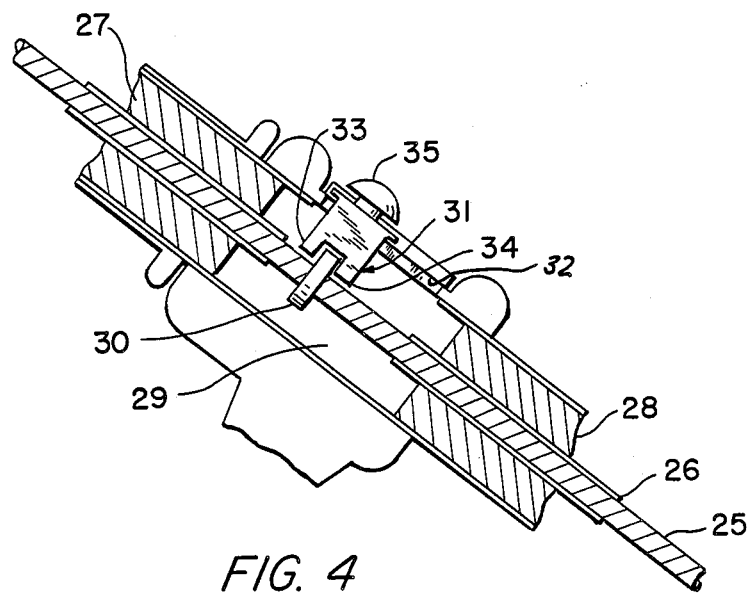
FIG. 4 is an axial section view taken at region 4 in FIG. 1.

The incremental feed of the line is enabled by the axial shifting of the flexible drive shaft. In FIG. 4, the flexible drive shaft is shown in a spacing 29 between two inserts 27, 28. A rotary collar 30 is rigidly fixed to the flexible drive shaft so as to rotate therewith. A fork 31 is fitted in a slot 32 in the handle. It has tangs 33, 34 which straddle the collar. A button 35 is accessible to the operator and connected to the fork. Movement of the button (and there-by also of the fork) will cause the fork to move axially and thereby will move the flexible drive shaft. A slip-joint (not shown) at the motive means enables the flexible drive shaft to be turned rotationally by the motive means, and also to be shifted axially. The combination of button, collar and fork is sometimes called "release means".

A throttle linkage 40 to control the engine speed is shown, but has no pertinence to this invention.

As best shown in FIG. 2, the head is a generally rounded body 45 with a button surface 46 adapted to engage the ground. However, ground engagement does not affect the axial position of the head relative to the handle.

Body 45 has an upper neck 47 which fits into a receptacle 48 on the handle, with a bearing (not shown) between them. A socket 49 is formed inside the neck. It has an inner non-circular wall 50. This wall may suitably be hexagonal. A tubular drive shaft 51 comprises a tube with an upper end 52 and a lower end 53. A non-circular drive element 54 extends beyond the shaft, and fits in socket 49. Preferably drive element 54 is hexagonal. In any event it fits in the socket so as to drive the housing. Lower end 53 has an axially extending slot 56.

Shaft 25 terminates in an enlargement 57 which has a cross-hole 58 to receive an indexing pin 59. Rotation of shaft 25 turns the indexing pin. In turn the indexing pin engages the edge of slot 56 and drives shaft 51. This in turn rotates the head because of the engagement at socket 49.

Spool 60 is fitted in the housing. It is coaxial with the housing. Neither shifts axially, and they are rotationally free of each other. An internal wall 61 of the spool bears sets 62, 63 of lugs such as lugs 64, 65. These sets are axially spaced apart from one another. The lugs of each set are angularly spaced from one another in pairs (diametrically opposite). The indexing pin extends radially to engage them. Also, the lugs are placed to cause the indexing pin to abut one or the other of the sets of lugs (in pairs), so that the spool is driven along with the housing. This is a viable drive.

Now if line is to be fed out, button 35 will merely be moved to the opposite end of its range of movement so the indexing pin, connected to the distal end of the flexible drive shaft, disengages one set of lugs and engages the other set of lugs. Because of the way the lugs are spaced from one another, this enables an incremental rotation (evenly or non-evenly) of the spool relative to the housing. The centrifugal force on the projecting line will pull out the released increment, and turn the spool appropriately. The feed will stop when the indexing pin abuts the next lug in the next set of lugs. Notice that there is no spring return of the flexible drive shaft. Should a next increment be desired, button 35 will be pushed in the opposite direction. Single actuation of the button to and fro enables the feeding of smaller single releases of line segments than in previous devices where a single actuation caused two releases of line segments.

Notice that slot 56 at the distal end of shaft 51 is a slip joint enabling the flexible drive shaft and its indexing pin to be shifted axially a finite distance in the handle.

This invention thereby enables a line feed system to be made with the use of only the flexible drive shaft itself, which is a substantial simplification. Trimmers are hard-used consumer appliances, and simplifications such as this lead to lesser maintenance problems, as well as to more affordable products.

This invention is not to be limited by the embodiment shown in the drawings and described in the description, which is given by way of example and not of limitation, but only in accordance with the scope of the appended claims.

I claim:

1. A line trimmer comprising:
    a handle to manipulate the trimmer, said handle having a proximal end and a distal end;
    a rotary head rotatably mounted to said handle adjacent to its distal end;
    motive means mounted to said handle adjacent to its proximal end;
    a flexible rotary shaft connected to said motive means and to said head whereby torque exerted by said motive means rotates said head, said flexible shaft having an axis of rotation and being axially movable relative to said motive means and to said head;
    said head including a rotary housing, and in said rotary housing, a coaxial rotary spool, said spool being adapted to hold a coil of line to be fed out through a port in said housing, said spool having an internal surface with a pair of sets of angularly spaced apart lugs, said sets being axially spaced apart from each other;
    an index pin extending radially from said flexible shaft to engage lugs of one or the other of said sets, depending on the axial position of said flexible shaft; and
    release means to shift said flexible shaft so the index pin engages lugs of a selected one of said sets.

2. Apparatus according to claim 1 in which said release means comprises a collar fixed to said flexible shaft so as to rotate and move axially therewith, and a fork straddling said collar accessible to the operator, to axially shift said collar and said flexible shaft, even while rotating.

3. Apparatus according to claim 1 in which a second drive shaft is rotatably engaged by said indexing pin, said second drive shaft having a non-circular drive element said second drive shaft, and in which said housing has a socket in which said non-circular drive element is fitted so this said housing is driven by said drive element, which in turn is driven by said drive pin and by said flexible shaft.

4. Apparatus according to claim 3 in which said release means comprises a collar fixed to said flexible shaft so as to rotate and move axially therewith, and a fork straddling said collar accessible to the operator axially to shift said collar and said flexible shaft even while rotating.

5. Apparatus according to claim 3 in which said second drive shaft has an axial slot at said distal end, in which said indexing pin is slidably fitted, and by which it is rotationally driven.

6. Apparatus according to claim 1 having said sets of angularly spaced apart lugs, in both said sets of axially spaced apart lugs, said lugs being uniformly spaced in even numbers of lugs about the internal surface of said spool so as to cause even incremental rotational indexing of said spool upon axial displacement of said index pin.

7. Apparatus accoring to claim 1 in which the lugs of said sets are
non-uniformly angularly spaced
so as to cause unequal sequential incremental rotational indexing of said spool upon each axial displacement of said index pin.

* * * * *